(12) United States Patent
Smith et al.

(10) Patent No.: US 10,247,594 B2
(45) Date of Patent: Apr. 2, 2019

(54) METER BYPASS ADAPTER

(71) Applicant: Georg Fischer Central Plastics LLC, Shawnee, OK (US)

(72) Inventors: Michael D. Smith, Shawnee, OK (US); Thomas G. Veeley, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 7 days.

(21) Appl. No.: 15/497,527

(22) Filed: Apr. 26, 2017

(65) Prior Publication Data

US 2018/0313682 A1    Nov. 1, 2018

(51) Int. Cl.
    *G01F 15/18*    (2006.01)
    *F16K 11/065*    (2006.01)
    *F16K 31/54*    (2006.01)

(52) U.S. Cl.
CPC .......... *G01F 15/185* (2013.01); *F16K 11/065* (2013.01); *F16K 11/0655* (2013.01); *F16K 31/54* (2013.01); *G01F 15/18* (2013.01); *Y10T 137/5997* (2015.04)

(58) Field of Classification Search
CPC ............................ G01F 15/185; Y10T 137/5997
See application file for complete search history.

(56) References Cited

U.S. PATENT DOCUMENTS

| | | | |
|---|---|---|---|
| 3,296,859 A * | 1/1967 | Stewart | G01F 15/185 137/599.13 |
| 3,318,176 A * | 5/1967 | Geier, Jr. | B25B 13/04 81/164 |
| 3,386,473 A * | 6/1968 | Driscoll | F16K 11/0833 137/599.13 |
| 3,946,754 A | 3/1976 | Cook | |
| 4,327,760 A | 5/1982 | Lancaster | |
| 4,890,645 A * | 1/1990 | Andersen | F16K 11/0743 137/625.21 |
| 5,654,505 A | 8/1997 | Jiles | |
| 5,785,086 A * | 7/1998 | Boyce | F16K 11/0716 137/625.38 |
| 5,934,304 A * | 8/1999 | Peterson | G01F 15/005 137/15.03 |

(Continued)

OTHER PUBLICATIONS

6410 Bypass Meter Bar Installation Instructions, Mar. 15, 2016, A. Y. McDonald Mfg. Co., Dubuque, Iowa.

(Continued)

*Primary Examiner* — Eric Keasel
*Assistant Examiner* — Kevin R Barss
(74) *Attorney, Agent, or Firm* — Bachman & LaPointe, P.C.

(57) ABSTRACT

A meter bypass adapter has a body having: a first port; a second port; a third port; and a fourth port. At least one valve element is held by the body and moveable between: a first position wherein a flowpath is open from the first port to the second port and a flowpath is open from the third port to the fourth port without a direct flowpath from the first port to the fourth port; and a second position wherein a flowpath extends from the first port to the fourth port bypassing the second port and the third port. A single rotary actuator is held by the body to rotate about an axis and, in turn, shift the least one valve element between the first position and the second position.

11 Claims, 10 Drawing Sheets

(56) References Cited

U.S. PATENT DOCUMENTS

| | | | | |
|---|---|---|---|---|
| 5,992,439 A | * | 11/1999 | McGill | G01F 15/005 137/15.03 |
| 6,840,493 B2 | * | 1/2005 | York | F15B 15/065 251/250 |
| 7,152,621 B1 | * | 12/2006 | Huetinck | F16K 5/0414 137/385 |
| 7,347,219 B2 | * | 3/2008 | Gohde | F16K 11/20 137/315.06 |
| 2013/0263951 A1 | * | 10/2013 | Gardner | F16K 11/087 137/625.11 |

OTHER PUBLICATIONS

Meter Outlet/Bypass Valves, Feb. 25, 2016, A. Y. McDonald Mfg. Co., Dubuque, Iowa.

* cited by examiner

METER BYPASS ADAPTER

BACKGROUND

The invention relates to gas meters. More particularly, the invention relates to gas meter changeout.

A well-developed field exists in meters for residential and commercial natural gas service. An exemplary meter has an inlet port/fitting receiving gas flow from a supply line and an outlet port/fitting delivering the gas to a building line. Although the inlet fitting and outlet fitting may be directly connected to respective fittings of the supply line and building line, common installations use a cast metallic meter bar. The meter bar has a first pair or fittings for respectively mating with fittings of the supply line and building line and then a second pair of fittings for respectively mating with the meter fittings (directly or indirectly). The second pair may have an on-center spacing the same as a standard on-center spacing of the fittings of the associated class of meter.

Meters often have to be replaced. When replacing a meter, it is undesirable to terminate all gas flow to the building line. Even if a full flow is not maintained during changeout (changeover), it may be desired to maintain a sufficient flow to keep pilots lit. Some changeover systems involve connection to a temporary gas supply such as a portable gas supply. Others involve bypassing the meter. Some bypass systems involve the in situ assembly of a temporary bypass conduit which is subsequently removed. Others are preassembled and remain in place after changeout. An example of these involves bypass meter bars.

A.Y. McDonald Mfg. Co., Dubuque, Iowa, manufactures several bypass meter bar systems. An exemplary such system has a cast body formed essentially as a combination of a pair of elbows and a bypass conduit joining the elbows. One elbow has an inlet from the supply line and an outlet to the meter inlet. The other elbow has an inlet from the meter outlet and an outlet to the building line. The bypass conduit extends between the elbows. Each elbow carries a three-way valve. An inlet valve has a first condition establishing communication between the supply line and meter while blocking the bypass conduit. An outlet valve likewise has a first condition establishing communication between the meter and the building line while blocking the bypass. Thus, the two first conditions allow normal operation of the meter.

In its second condition, the inlet valve establishes communication between the supply line and the bypass conduit while blocking the meter inlet. In its second condition, the outlet valve establishes communication between the bypass conduit and the building line while blocking the meter outlet. Having both valves in their second conditions is a bypass condition allowing the meter to be removed and replaced. In variations, one or both valves may have additional conditions. To avoid gas theft, the valves may be lockable in their respective first conditions.

SUMMARY

One aspect of the disclosure involves a meter bypass adapter comprising a body having: a first port; a second port; a third port; and a fourth port. At least one valve element is held by the body and moveable between: a first position wherein a flowpath is open from the first port to the second port and a flowpath is open from the third port to the fourth port without a direct flowpath from the first port to the fourth port; and a second position wherein a flowpath extends from the first port to the fourth port bypassing the second port and the third port. A single rotary actuator is held by the body to rotate about an axis and, in turn, shift the least one valve element between the first position and the second position.

In one or more embodiments of any of the foregoing embodiments, the at least one valve element is mounted in the body for a linear shift between the first position and the second position.

In one or more embodiments of any of the foregoing embodiments, the at least one valve element comprises a first valve element and a second valve element.

In one or more embodiments of any of the foregoing embodiments, the first valve element and the second valve element each have a toothed rack; and the actuator has a pinion engaged to the toothed rack of the first valve element and the second valve element.

In one or more embodiments of any of the foregoing embodiments, an assembly comprises the meter bypass adapter and further comprises a gas meter having: an inlet coupled to the second port; and an outlet coupled to the third port.

In one or more embodiments of any of the foregoing embodiments: the gas meter has a threaded male inlet fitting and a threaded male outlet fitting; the meter bypass adapter has a threaded male fittings at the first port, the second port, the third port, and the fourth port; a first male-to-male adapter connects the second port threaded male fitting to the threaded male inlet fitting; and a second male-to-male adapter connects the third port threaded male fitting to the threaded male outlet fitting.

In one or more embodiments of any of the foregoing embodiments, a method for using the meter bypass adapter comprises: shifting the valve element from the first position to the second position; with the valve element in the second position, decoupling a first gas meter from the second port and third port; with the valve element in the second position, coupling a second gas meter to the second port and third port; and, after the coupling, shifting the valve element from the second position to the first position.

In one or more embodiments of any of the foregoing embodiments, the shift from the second position to the first position passes through an intermediate condition wherein all four ports are in communication with each other.

Another aspect of the disclosure involves a meter bypass adapter comprising a body having: a first port; a second port; a third port; and a fourth port. A first valve element is held by the body and moveable between a first position and a second position. A second valve element is held by the body and moveable between a first position and a second position. An actuator is coupled to the first valve element and second valve element to synchronize movement of the first valve element and second valve element between their respective first position and second position. With the first valve element and second valve element in their respective first positions a flowpath is open from the first port to the second port and a flowpath is open from the third port to the fourth port. With the first valve element and second valve element in their respective second positions, a flowpath is open from the first port to the fourth port bypassing the second port and third port.

In one or more embodiments of any of the foregoing embodiments, movement of the first valve element between its first position and its second position is linearly opposite movement of the second valve element between its first position and its second position.

In one or more embodiments of any of the foregoing embodiments, the actuator comprises a pentagonal socket for receiving a key to rotate the actuator.

In one or more embodiments of any of the foregoing embodiments, the actuator is a rotary actuator held by the body to rotate about an axis and, in turn, linearly shift the first valve element and the second valve element.

In one or more embodiments of any of the foregoing embodiments, an assembly comprises the meter bypass adapter and further comprises a gas meter having: an inlet coupled to the second port; and an outlet coupled to the third port.

In one or more embodiments of any of the foregoing embodiments, the gas meter has a threaded male inlet fitting and a threaded male outlet fitting. The meter bypass adapter has a threaded male fittings at the first port, the second port, the third port, and the fourth port. A first male-to-male adapter connects the second port threaded male fitting to the threaded male inlet fitting. A second male-to-male adapter connects the third port threaded male fitting to the threaded male outlet fitting.

In one or more embodiments of any of the foregoing embodiments, a method for using meter bypass adapter method comprises: shifting the first valve element and the second valve element from their respective first positions to their respective second positions; with the first valve element and the second valve element in their respective second positions, decoupling a first gas meter from the second port and third port; with the first valve element and the second valve element in their second positions, coupling a second gas meter to the second port and third port; and after the coupling, shifting first valve element and the second valve element to their respective first positions.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
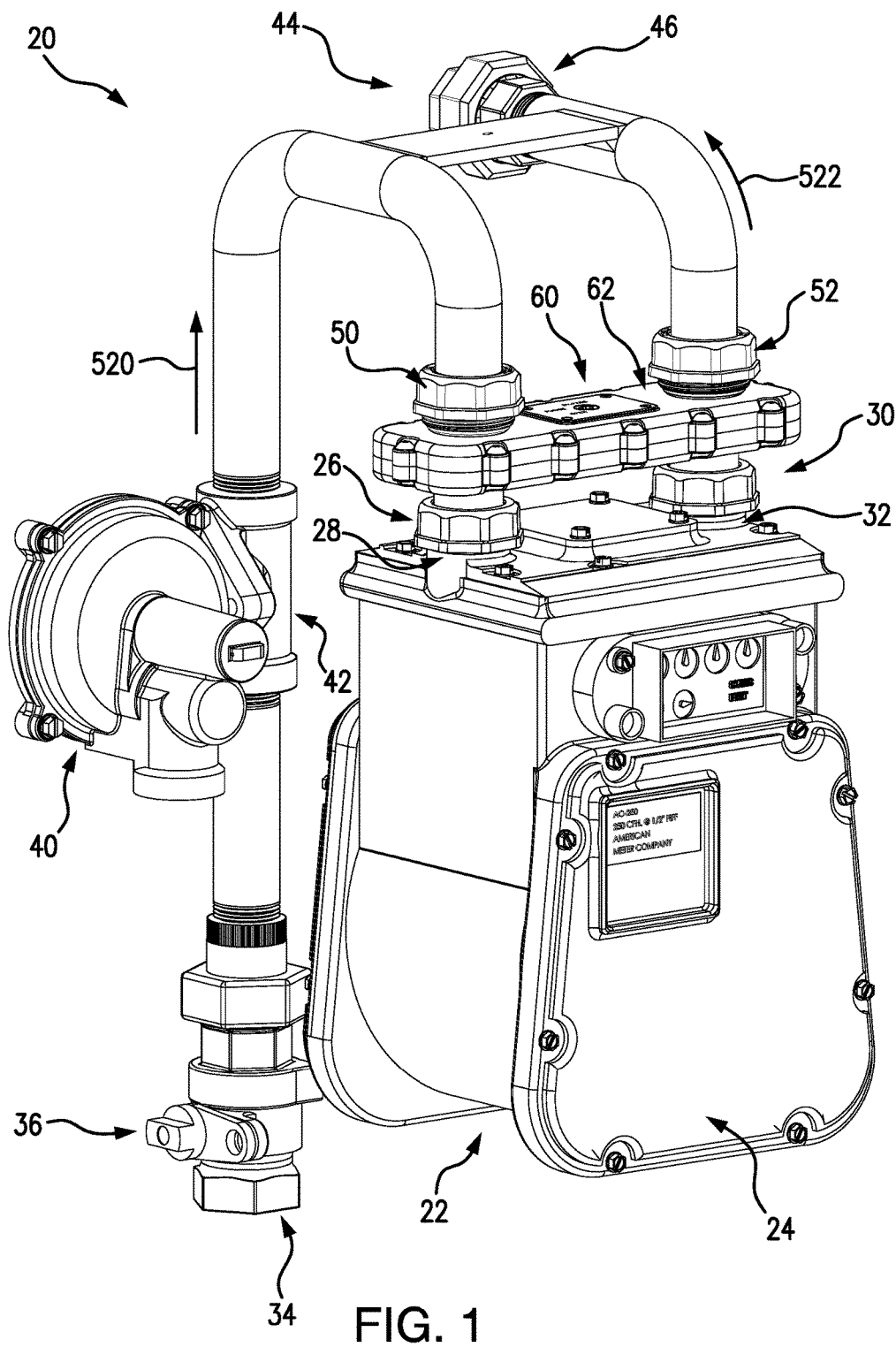
FIG. 1 is a view of a gas meter set.

FIG. 1 shows a gas meter set 20 comprising a meter 22 having a meter housing assembly 24. The exemplary meter includes an inlet 26 at an inlet fitting 28 and an outlet 30 at an outlet fitting 32.

The meter set includes an inlet 34 for connection to a gas supply (e.g., a riser (not shown)) from an underground service line (not shown). The exemplary inlet 34 is an inlet of a shutoff valve 36. An inlet/supply flowpath 520 extends downstream from the inlet 34 to the meter inlet 26 in a normal mode of operation. Along the inlet flowpath, a pressure regulator 40 is mounted to a tee fitting 42.

In the normal mode of operation, an outlet flowpath 522 extends from the meter outlet 30 to an outlet 44 of the meter set (e.g., at a fitting 46 for connection to a building gas line—not shown).

Various illustrated pipes and fittings may be of conventional form (e.g., cast iron, steel, or brass pipe and threaded fittings with steel or brass nuts and appropriate gaskets, if any).

As so far described, the meter set may be one of many different known or yet-developed configurations to which the present teachings may apply.

As an additional feature, however, the meter set includes a meter bypass adapter 60 having a housing or body assembly (body) 62. The body 62 has multiple ports.

Figure 2:
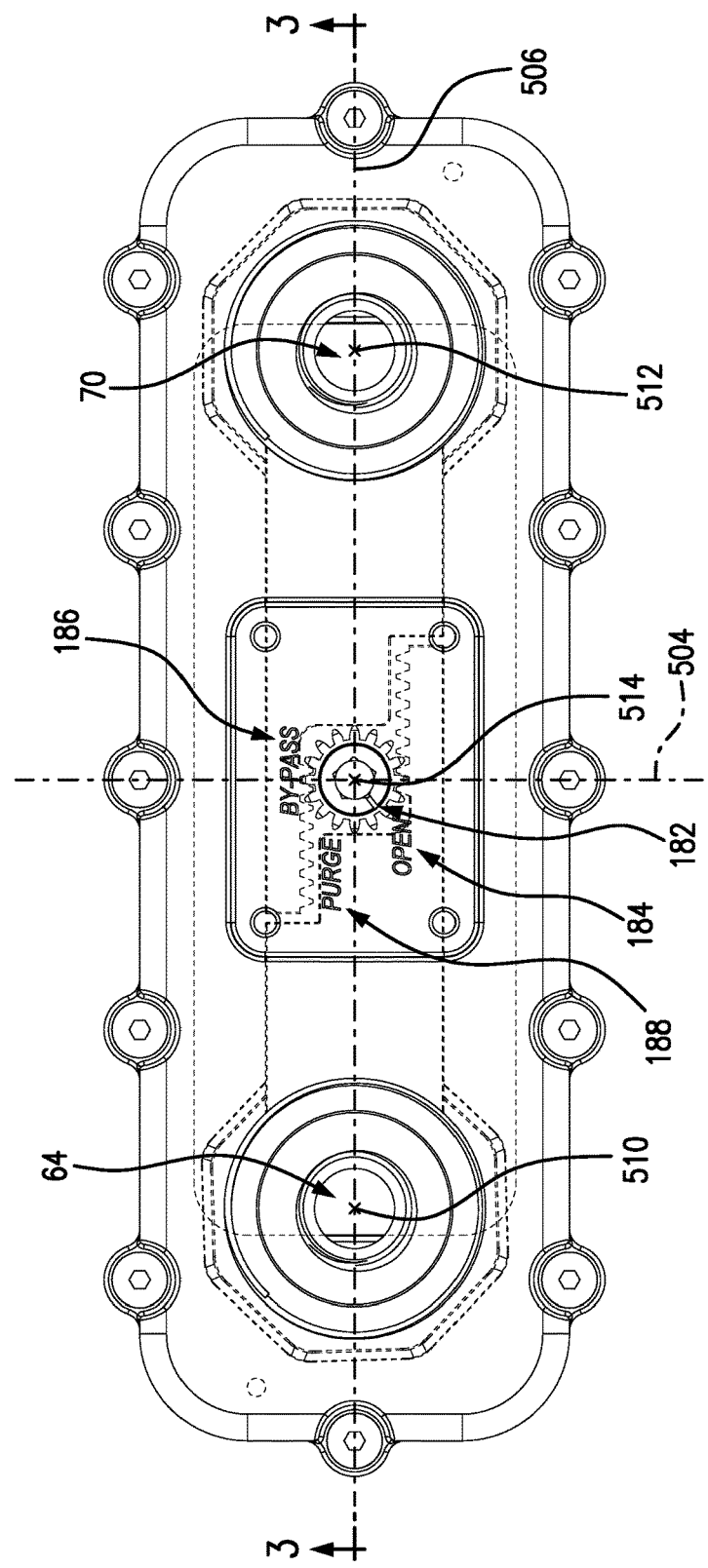
FIG. 2 is a top X-ray view of a bypass adapter of the meter set in a normal (open) operational condition.
Figure 3:
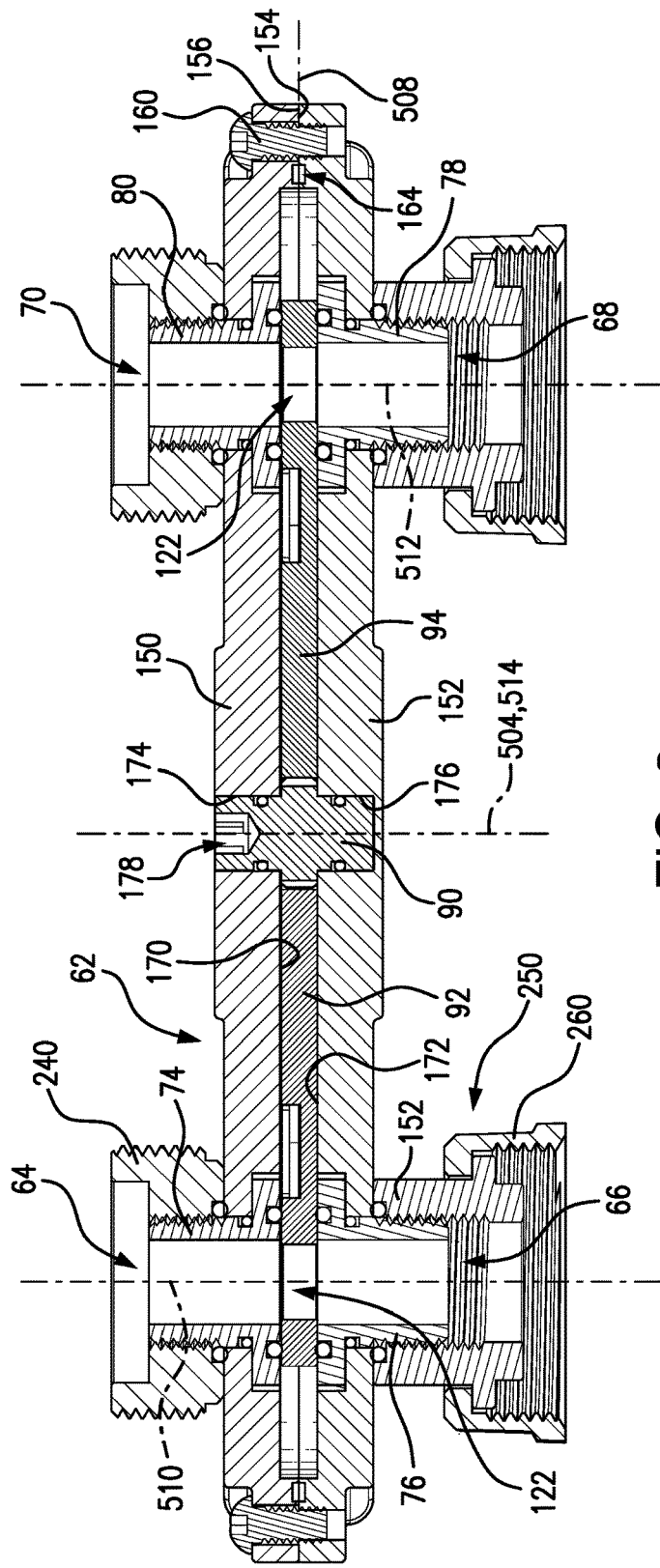
FIG. 3 is a central transverse (vertical) sectional view of the bypass adapter, taken along line 3-3 of FIG. 2.

FIGS. 2 and 3 show a first port 64, a second port 66, a third port 68, and a fourth port 70. In the normal mode of operation, the first port 64 is an inlet receiving gas along the inlet flowpath from the meter set inlet 34 and through the pressure regulator 40; the second port 66 is an outlet to the meter coupled to the meter inlet 26 (e.g., as discussed below); the third port 68 is coupled to the meter outlet 30 to receive gas from the meter; and the fourth port 70 is coupled to an outlet line along the outlet flowpath extending to the meter set outlet 44. As is discussed further, the exemplary ports 64, 66, 68, and 70 are formed along threaded fittings 74, 76, 78, 80 which, in turn, are connected to adapters to interface with larger threaded fittings of the meter and meter set piping.

The adapter 60 comprises a rotary actuator 90 coupled to one or more valve elements 92, 94 to shift the one or more valve elements between a plurality of conditions associated with respective modes of operation. A first condition is associated with the aforementioned normal mode of operation of the meter wherein the inlet flowpath is open from the first port 64 to the second port 66 and the outlet flowpath is open from the third port 68 to the fourth port 70 without any bypass (i.e., without any direct flowpath from the first port to the fourth port).

Figure 6:
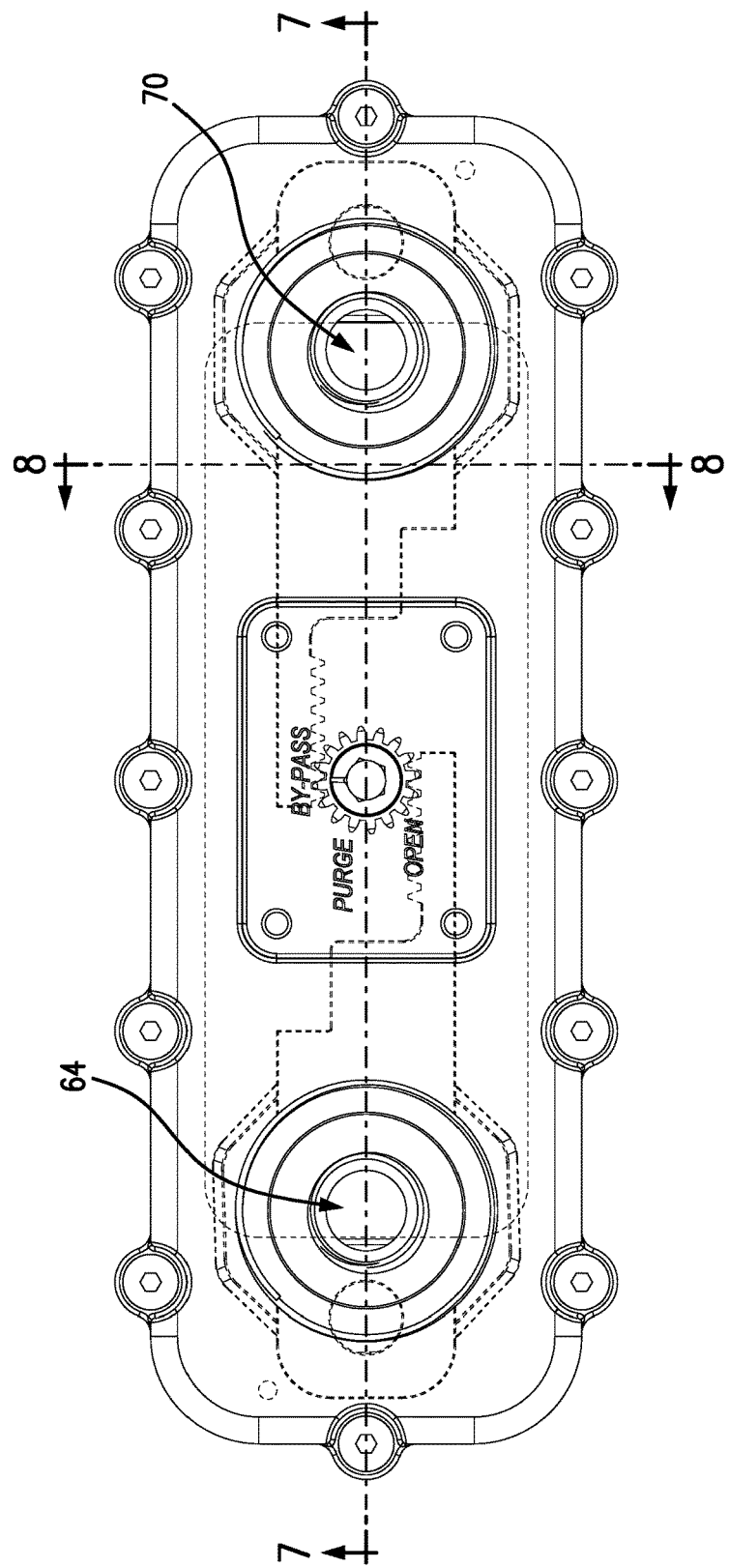
FIG. 6 is a top X-ray view of the bypass adapter in a bypass condition.

In a second condition of the adapter (FIGS. 6-8), there is a bypass flowpath from the first port to the fourth port bypassing the second port and the third port. In this exemplary condition, there is no communication between either the first port 64 or the fourth port 70 and the second port 66 or the third port 68. This bypass condition allows the meter to be moved and replaced while gas continues to the delivered into the building.

Figure 9:
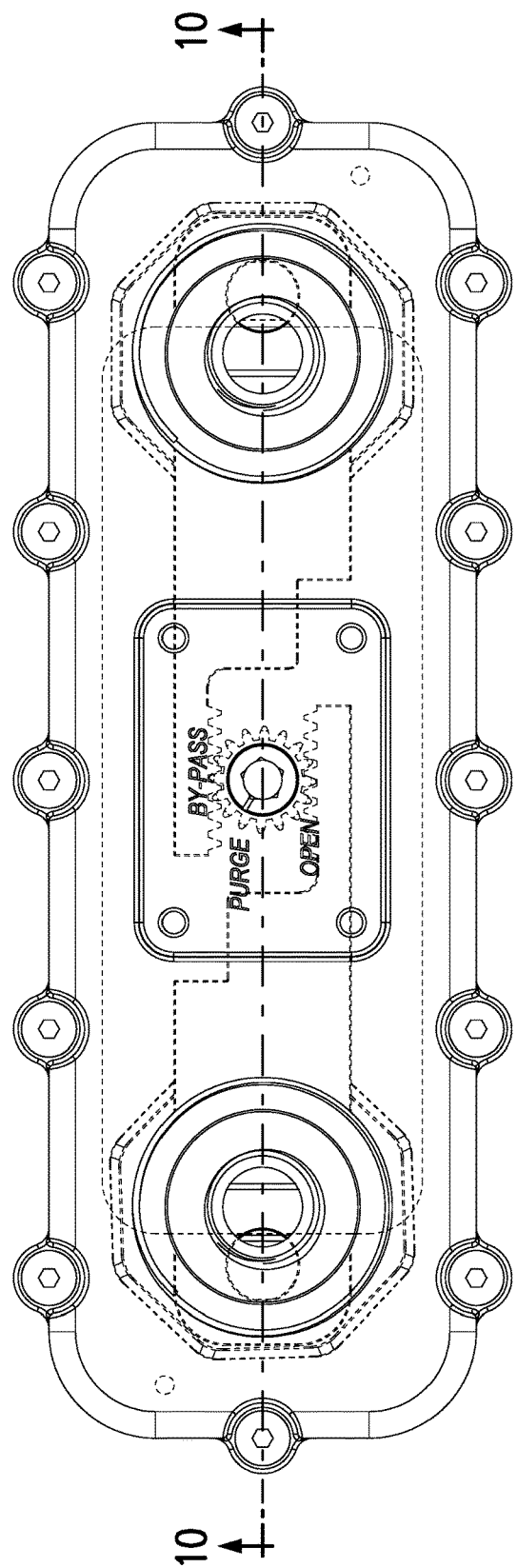
FIG. 9 is a top X-ray view of the bypass adapter in a transitional (purge) condition.
Figure 10:
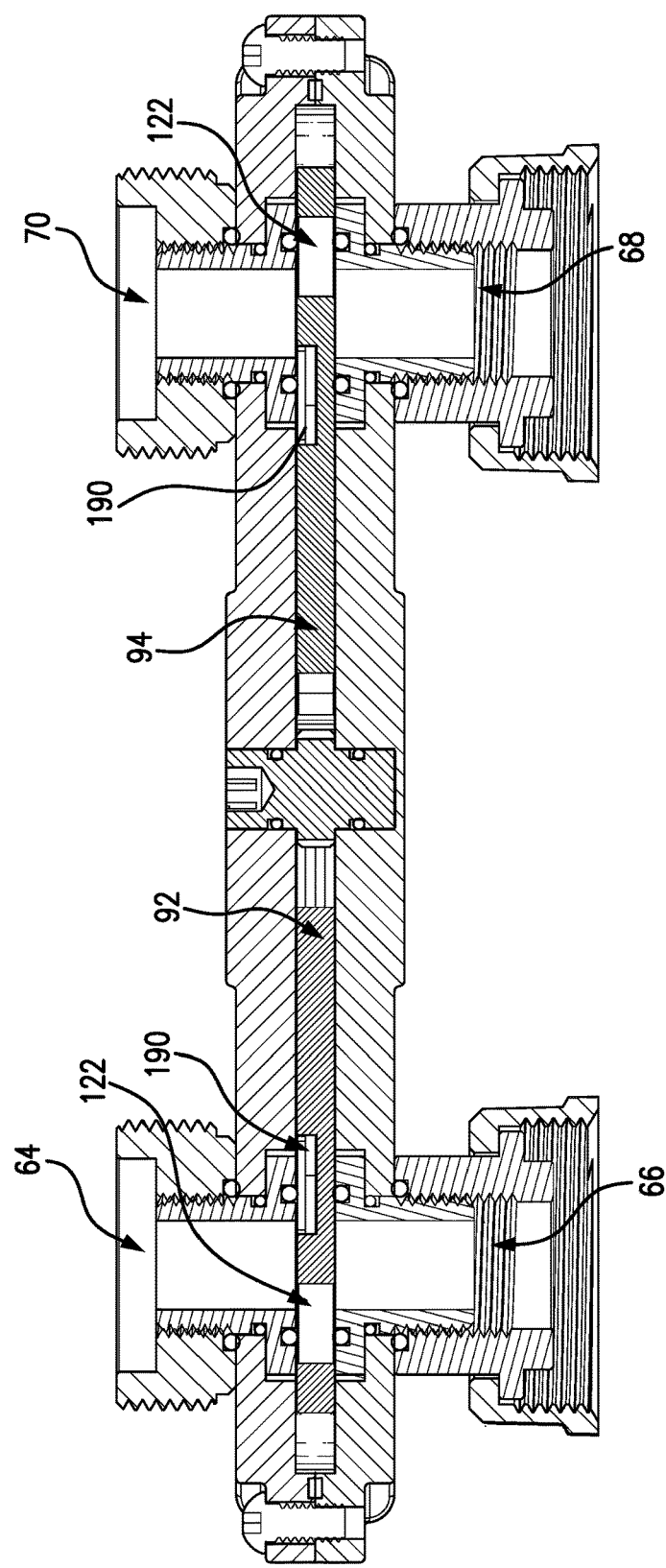
FIG. 10 is a central transverse vertical sectional view of the bypass adapter, taken along line 10-10 of FIG. 9.

As is discussed further below, the exemplary bypass adapter 60 also has a third condition which is a purge condition (FIGS. 9 and 10). In the purge condition, there is communication between all four ports. In this situation, flow directly from the first port 64 to the fourth port 70 (i.e., bypassing the meter) may maintain service. This is used to purge a replacement or reinstalled meter of air as is discussed below.

Figure 4:
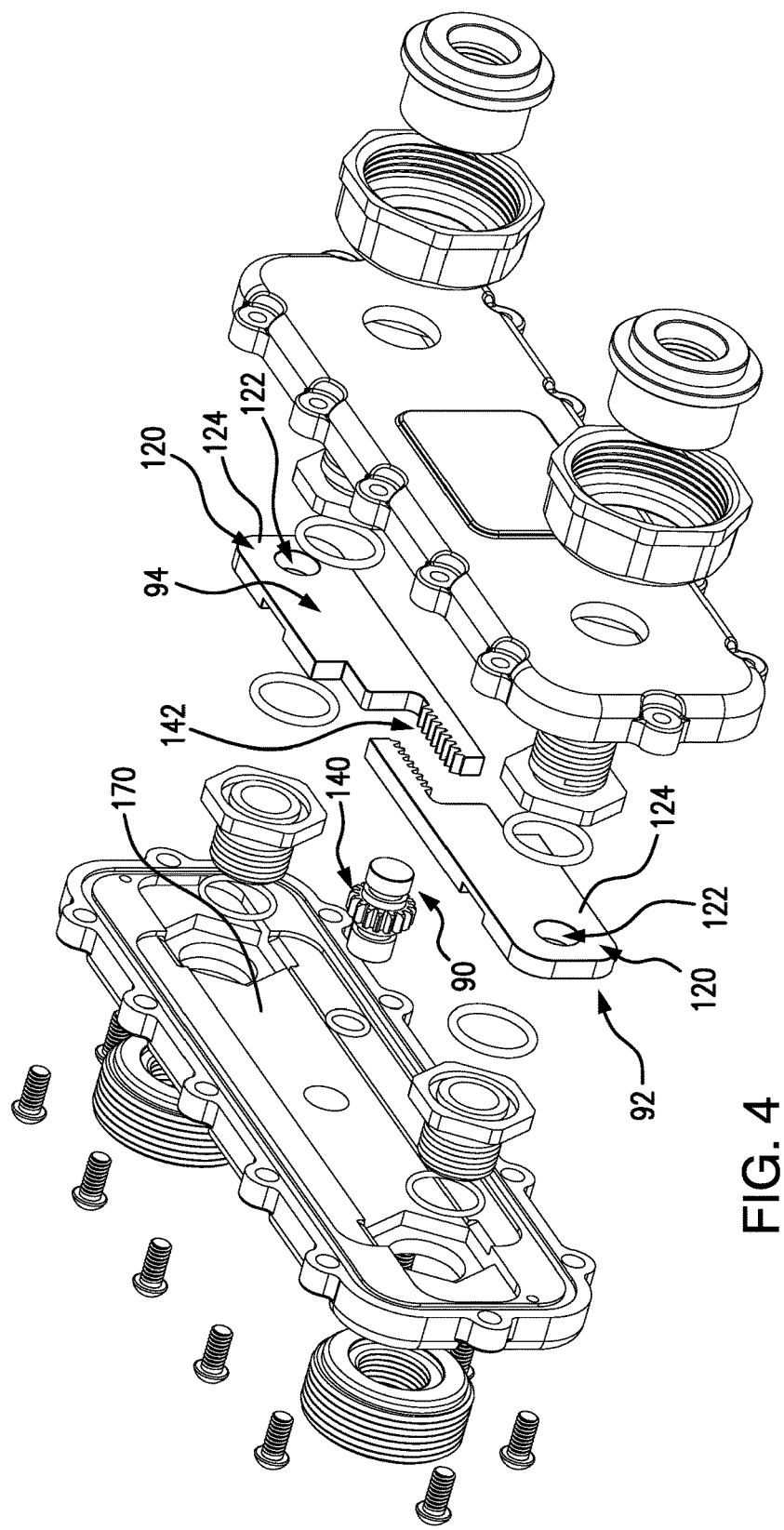
FIG. 4 is a first exploded view of the bypass adapter.
Figure 5:
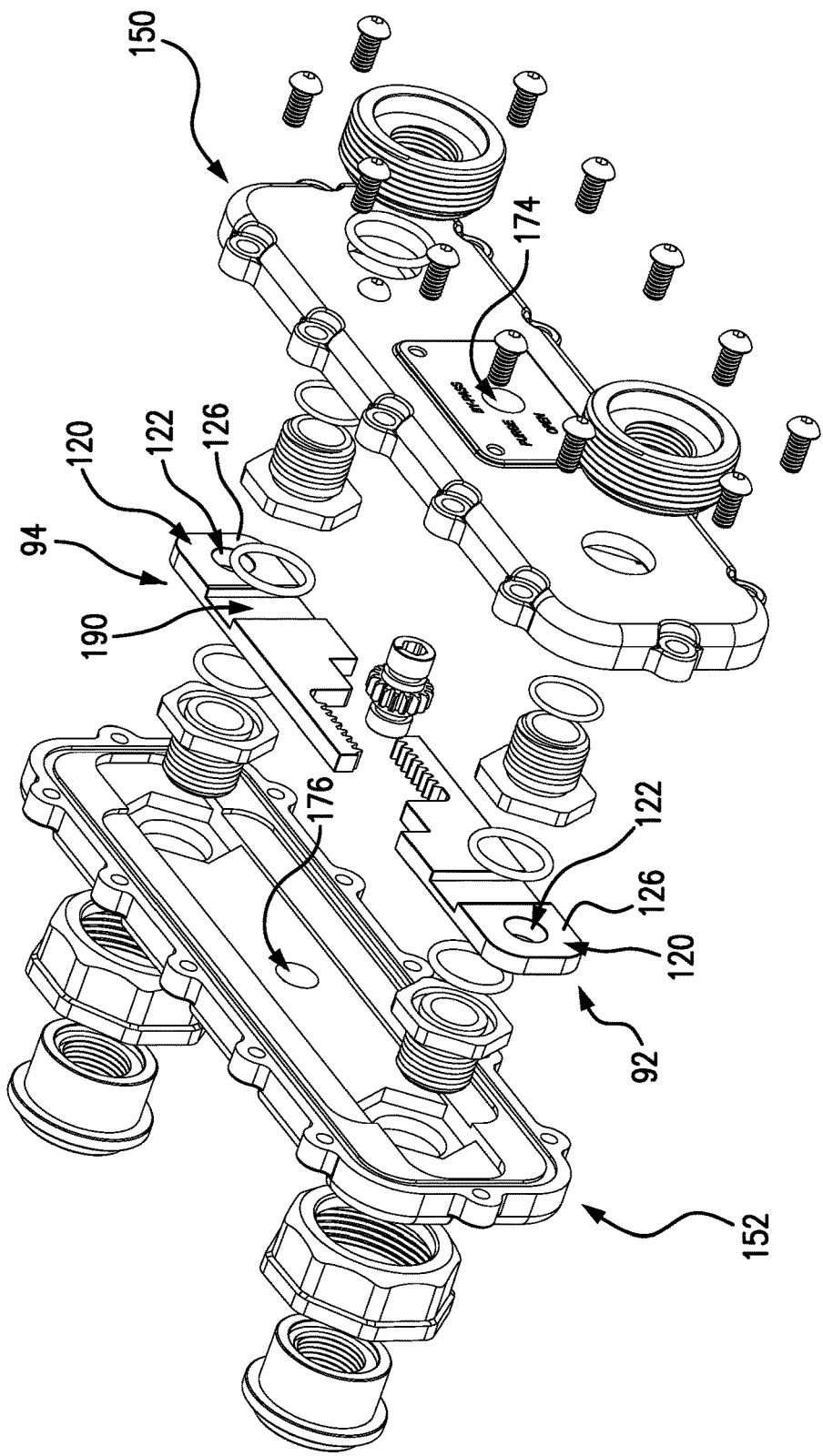
FIG. 5 is a second exploded view of the bypass adapter.

Each exemplary valve element 92, 94 FIGS. 4 and 5) has a first portion 120 bearing a port 122 for passing the associated flow to or from the meter. In this example, the valve elements have an underside 124 which, along the portion 120, seals relative to the respective port 66 or 68 in the open condition. Similarly, the valve elements have an upper surface 126 which, along the portion 120, seals relative to the respective port 64 or 70 in the open condition. In the exemplary implementation, the underside 124 is flat, along a sufficient extent, to maintain sealing engagement with the associated port 64 or 68 even in the bypass condition (thus allowing an intact portion of the valve element underside to seal with and block that port).

Thus, in the open condition, each of the ports 122 is aligned with the two associated adapter ports. FIG. 3 shows the port 122 of the first valve element 92 coaxial about an axis 510 with the respective ports 64 and 66 and the port 122 of the second valve element 94 as coaxial along an axis 512 with the ports 68 and 70 and their associated fittings (discussed below).

FIG. 2 shows a front-to-back central vertical plane 504 and a lateral central vertical plane 506. In the exemplary embodiment, the axes 510 and 512 fall along the plane 506 and the axis 514 of the rotary actuator 90 falls at the intersection of the planes 504 and 506. In the exemplary embodiment, the rotary actuator serves to actuate the valve elements in directions toward and away from the plane 504. In the exemplary embodiment, the open condition is a maximally retracted condition of the valve elements and the bypass condition is a maximally extended condition. The purge condition is an intermediate condition.

The exemplary rotary actuator 90 (FIG. 4) comprises a pinion gear 140 enmeshed with toothed racks 142 of the respective valve elements 92, 94. Accordingly, rotating the rotary actuator 90 in one direction about its axis of rotation 514 extends the valve elements relative to each other while rotation in the opposite direction retracts them.

As is discussed further below, the exemplary housing 62 (FIG. 3) comprises an upper member (upper half) 150 and a lower member (lower half) 152 meeting along a transverse horizontal centerplane 508. The exemplary halves 150 and 152 are brass formed by casting and machining or merely machining from bar stock. An array of fasteners 160 (e.g., screws) circumscribes a perimeter of the assembled halves to attach one to the other. Among the not shown, a gasket may seal the two halves along combined slots 164 in mating surfaces 154 and 156. The valve elements 92, 94 are held for reciprocal linear motion (e.g., between surfaces 170 and 172 of respective portions of the compartments formed in the two halves. The two halves also include respective bores 174 and 176 (the former being a through-bore and the latter being a blind bore) capturing associated upper and lower circular section portions of the actuator 90 to hold it for rotation about the axis 514. Bore 174 is open to an exterior (upper) surface of the half 150 to allow driving access to the rotary actuator. The exemplary driving access is provided by a five-sided socket 178 in the upper surface of the rotary actuator. A five-sided socket is regarded as a security feature equivalent to a lock. This is because five-sided drivers are not commonly available. Alternative embodiments may include other actuators (e.g., handles) which, therefore, might have actual external locking features such as a clasp for engagement by a padlock.

Figure 7:
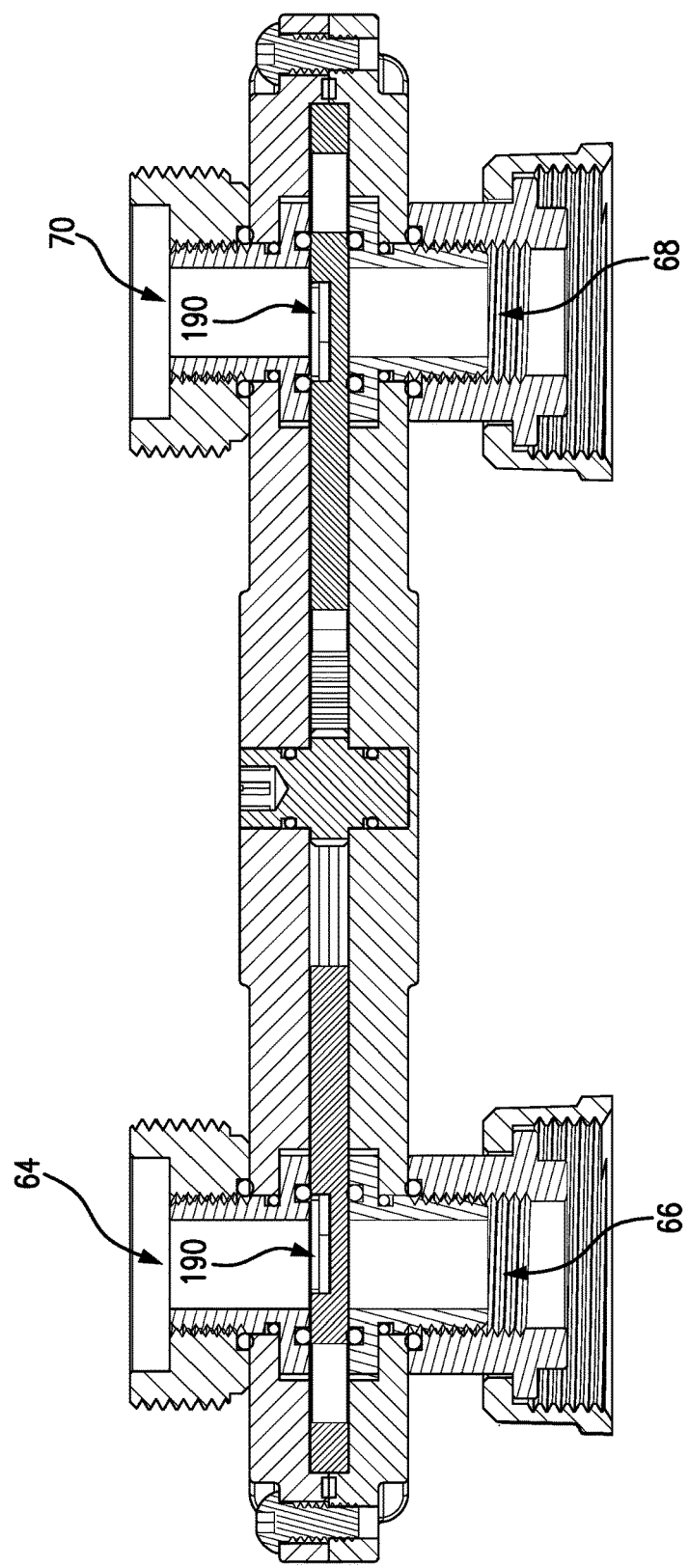
FIG. 7 is a central transverse vertical sectional view of the bypass adapter, taken along line 7-7 of FIG. 6.
Figure 8:
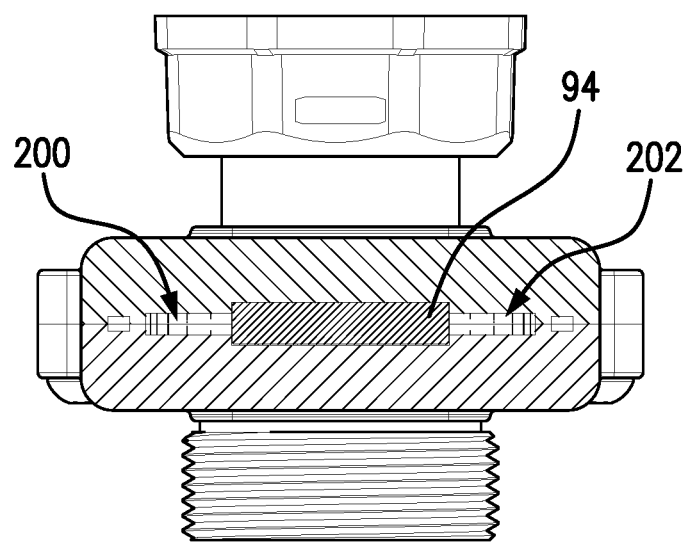
FIG. 8 is a central front-to-back vertical sectional view of the bypass adapter taken along line 8-8 of FIG. 6.

To allow bypass flow, the upper surfaces 126 of the valve elements 92, 94 contain slots 190 (FIG. 5) which align with and become exposed to the ports 64 and 70 in the bypass condition (FIG. 7). The slots 190 thus allow flow to pass around the valve elements into chamber portions 200, 202 (FIG. 8), respectively in front of and behind the valve elements. Thus, flow from the port 64 passes front and back through the first valve element slot 190 then passes front and back along the valve elements through the compartment portions 200 and 202 reentering the ends of the slot 190 of the second valve element to pass out in port 70. In this position, it is seen that intact portions of the underside block the second port and third port from any communication.

The exemplary fittings 74, 76, 78, 80 are identical and, in the exemplary embodiment, are male threaded fittings of a size equal to or smaller than the smallest anticipated pipe and meter threads to facilitate use of further adapters 240 and 250 (FIG. 3) for mating with specific pipe sizes of the associated installation. In the exemplary embodiment, the fittings 74, 76, 78, 80 are flanged male threaded fittings having hexagonal flanges rotationally locked in associated hexagonal counterbores in the adjacent interior surface of the associated housing half 150 or 152. The top (from the point of view of the fitting) surface of each flange bears a groove for capturing a sealing O-ring to seal with the adjacent surface of the associated valve element. Adjacent the underside, a radially outwardly open channel carries another O-ring for sealing with an associated bore in the housing through which the threaded portion protrudes. Yet other systems may be used including cast-in-place fittings. The adapters 240 are female-to-male adapters with a proximal internally threaded portion for mating with the associated externally threaded portion of the fitting 74, 76, 78, 80. An externally threaded portion of the adapter 240 is dimensioned to mate with a female fitting of the nominal size of the piping system. Similarly, the fitting 250 is a two-piece fitting comprising a first piece 252 and a second piece 260. The first piece 252 has an internally threaded portion mated to the associated threaded portion of fitting 76, 80 and a flange capturing an internally threaded portion 260 of the associated meter fitting 28, 32.

Accordingly, the exemplary system may be manufactured by machining the various pieces (of which the fittings may be stock items). In the exemplary embodiment, for economy, the valve elements 92 and 94 are identical (merely in different orientation). The elements may be assembled such as from the exploded conditions of FIGS. 4 and 5 and screws tightened.

Among other variations, the adapter could include only a single valve element (i.e., having two apertures for alignment with the two ports and reciprocally moving with a single motion).

At assembly, care may be taken to position the valve elements in one of the bypass condition or open condition so that, also, an indicator 182 (FIG. 2) on the exposed upper end of the actuator is aligned with an indicia 182 or 186 associated with said condition. FIG. 2 also shows a purge indicia 188. These indicias may be machined in the housing upper half or attached to a boilerplate thereatop (e.g., via screws or rivets). The fittings 240 may then be attached to the associated internally-threaded fittings 50, 52 (FIG. 1) of the respective lines to the meter and from the meter. The meter may then be installed by tightening the fittings 260 to the associated fitting 28 and 32.

In service, the system is normally run with the bypass adapter in the open condition. When the meter must be changed or serviced, a technician inserts a complementary five-sided key (not shown) into the socket 178 and rotates the actuator initially to the bypass condition which may involve passing through the purge condition. This blocks the meter. The technician may then loosen the fittings 260 and remove the meter.

With the adapter in the bypass condition, the meter may be serviced or replaced with a replacement meter. To make use of the purge condition, the technician may tighten only one fitting 260 (e.g., the fitting 260 at port 66 and meter inlet fitting 28). The fitting 260 at the meter outlet fitting 30 is left loose. The technician may rotate the actuator back to the purge condition and hold for a predetermined time (e.g. in the range of two to five seconds). During this time, flow enters the meter inlet and passes through the meter purging the meter of air which may leak out at the loose fitting 260 at the meter outlet fitting 30. The technician then tightens the fitting 260 at the meter outlet fitting 30 and rotates the actuator to the open condition to restore metered service. The purge avoids having a slug of air from the meter pass into the building and possibly blow out pilot lights.

The various components may be made using otherwise conventional or yet-developed materials and techniques.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to modifying a configuration of an existing meter installation, details of such configuration or its associated use may influence details of particular implementations. Accordingly, other embodiments are within the scope of the following claims.

What is claimed is:

1. A meter bypass adapter comprising:
   a body having:
   a first port;
   a second port;
   a third port; and
   a fourth port; and
   at least one valve element mounted in the body for a linear shift between:
      a first position wherein a flowpath is open from the first port to the second port and a flowpath is open from the third port to the fourth port without a direct flowpath from the first port to the fourth port; and
      a second position wherein a flowpath extends from the first port to the fourth port bypassing the second port and the third port; and
   a single rotary actuator held by the body to rotate about an axis and, in turn, shift the least one valve element between the first position and the second position,
   wherein
      the at least one valve element comprises a first valve element and a second valve element;
      the first valve element and the second valve element each have a toothed rack; and
      the actuator has a pinion engaged to the toothed rack of the first valve element and the second valve element.

2. An assembly comprising the meter bypass adapter of claim 1 and further comprising:
   a gas meter having:
   an inlet coupled to the second port; and
   an outlet coupled to the third port.

3. The assembly of claim 2 wherein:
   the gas meter has a threaded male inlet fitting and a threaded male outlet fitting;
   the meter bypass adapter has a threaded male fittings at the first port, the second port, the third port, and the fourth port;
   a first male-to-male adapter connects the second port threaded male fitting to the threaded male inlet fitting; and
   a second male-to-male adapter connects the third port threaded male fitting to the threaded male outlet fitting.

4. A method for using the meter bypass adapter of claim 1 to replace a first gas meter with a second gas meter, the method comprising:
   with the first gas meter coupled to the second port and third port, shifting the valve element from the first position to the second position;
   with the valve element in the second position, decoupling the first gas meter from the second port and third port;
   with the valve element in the second position, coupling the second gas meter to the second port and third port; and
   after the coupling, shifting the valve element from the second position to the first position.

5. The method of claim 4 wherein:
   the shift from the second position to the first position passes through an intermediate condition wherein all four ports are in communication with each other.

6. A meter bypass adapter comprising:
   a body having:
   a first port;
   a second port;
   a third port; and
   a fourth port;
   a first valve element held by the body and moveable between a first position and a second position;
   a second valve element held by the body and moveable between a first position and a second position; and
   an actuator coupled to the first valve element and second valve element to synchronize movement of the first valve element and second valve element between their respective first position and second position,
   wherein:
      movement of the first valve element between its first position and its second position is linearly opposite movement of the second valve element between its first position and its second position;
      with the first valve element and second valve element in their respective first positions a flowpath is open from the first port to the second port and a flowpath is open from the third port to the fourth port; and
      with the first valve element and second valve element in their respective second positions, a flowpath is open from the first port to the fourth port bypassing the second port and third port.

7. The meter bypass adapter of claim 6 wherein:
   the actuator comprises a pentagonal socket for receiving a key to rotate the actuator.

8. The meter bypass adapter of claim 6 wherein:
   the actuator is a rotary actuator held by the body to rotate about an axis and, in turn, linearly shift the first valve element and the second valve element.

9. An assembly comprising the meter bypass adapter of claim 6 and further comprising:
   a gas meter having:
   an inlet coupled to the second port; and
   an outlet coupled to the third port.

10. The assembly of claim 9 wherein:
    the gas meter has a threaded male inlet fitting and a threaded male outlet fitting;
    the meter bypass adapter has a threaded male fittings at the first port, the second port, the third port, and the fourth port;
    a first male-to-male adapter connects the second port threaded male fitting to the threaded male inlet fitting; and
    a second male-to-male adapter connects the third port threaded male fitting to the threaded male outlet fitting.

11. A method for using meter bypass adapter of claim 6 to replace a first gas meter with a second gas meter, the method comprising:
- with the first gas meter coupled to the second port and third port, shifting the first valve element and the second valve element from their respective first positions to their respective second positions;
- with the first valve element and the second valve element in their respective second positions, decoupling the first gas meter from the second port and third port;
- with the first valve element and the second valve element in their second positions, coupling the second gas meter to the second port and third port; and
- after the coupling, shifting first valve element and the second valve element to their respective first positions.

* * * * *